Dec. 31, 1946.  V. G. KLEIN  2,413,357

RECIPROCATING MECHANISM

Filed Feb. 17, 1945

Victor G. Klein,
Inventor.
Haynes and Koenig
Attorneys.

Patented Dec. 31, 1946

2,413,357

UNITED STATES PATENT OFFICE 2,413,357

RECIPROCATING MECHANISM

Victor G. Klein, St. Louis, Mo., assignor to Lincoln Engineering Company, St. Louis, Mo., a corporation of Missouri Application February 17, 1945, Serial No. 578,515

7 Claims. (Cl. 103—174)

This invention relates to reciprocating mechanisms, and with regard to certain more specific features, to a radial reciprocating mechanism for use as an engine or pump to be operated with a constant-pressure stroke.

Among the several objects of the invention may be noted the provision of a simple, high-speed radial reciprocating mechanism which with accuracy may be produced economically in mass production; the provision of a mechanism of the class described having a very simple and reliable form of valve gear having no springs; and the provision of a mechanism of this class in which the crankcase may readily be used in a fluid circuit which either feeds to or receives fluid from the mechanism under pressure. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a vertical section of the mechanism viewed from what will be called the front;

Similar reference characters indicate corresponding parts throughout the several views of the drawing.

Figure 1:
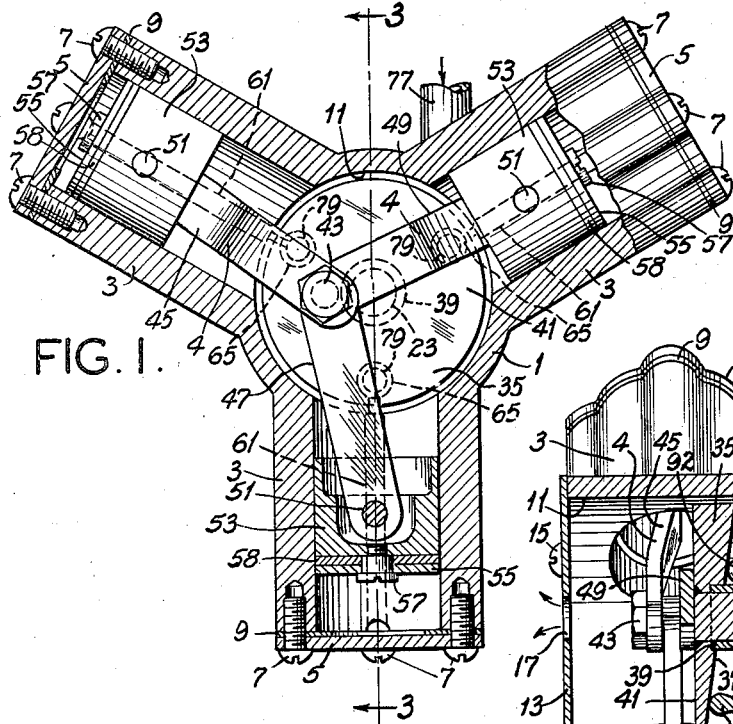

Referring now more particularly to the drawing, there is shown at numeral 1 a crankcase formed integrally with three preferably identical radial cylinders 3. The heads of the cylinders consist of caps 5 held down by cap screws 7, a gasket 9 being interposed under the cap in each case.

The front of the crankcase 1, thus formed, is counterbored as indicated at 11 for accommodating crank parts to be described. This counterbore is enclosed by means of a cover plate 13 held down by means of cap screws 15. The plate 13 has a fluid transmitting opening 17 therein.

The bottom 21 of the counterbore 11 forms a rear enclosure which is made up as a boss 19. The boss and the enclosure are drilled and reamed to form a bearing for a crankshaft 23. This shaft 23 just outside the boss 19 has a shoulder 25 on which rests a washer 27 held down by means of a nut 29 and a lock nut 31. When the device is used as an engine, an extension 33 of the crankshaft 23 acts as a power shaft. When it is used as a pump, this shaft 33 is the drive shaft. Or, the device may be operated in a fluid circuit to drive an indicator connected with shaft 33, for example, in a lubricant or similar measuring system.

Welded to the inner end of the shaft 23 is a crank disc 35, the rear surface of which is made up as an axial cam 37. A spacing collar 39 is employed between the crank disc 35 and the bottom of the counterbore 11 for holding the cam 37 in a position clear of said bottom. The front of the crank disc 35 is preferably flat, as indicated at 41. Threaded to this front is a crank pin 43. Pivoted to the crank pin 43 are connecting rods 45, 47 and 49. These rods at their opposite ends are pivoted to wrist pins 51 of pistons 53 which reciprocate in the cylinders 3. Each piston has a resilient packing 58 held to its head by a metal cap 55. Fastener screws 57 hold down the caps 55 and packings 58. The resilient packings float between pistons 53 and heads 55 and provide radial sealing on the cylinder walls. Piston rings could also be used.

The connecting rod 47 is made of flat stock. Connecting rods 45 and 49 are made of similar stock but centrally offset as indicated at 4. The offsets are at the same locations on each rod 45 and 47. Thus these rods are identical, so far as their manufactured shapes are concerned, but they are applied with the offsets oppositely directed with respect to and sandwiching the flat rod 47. This places all of the pivoted connections with the wrist pins 51 in a single plane, and requires for manufacture only two different forms of rods. At the wrist pin 43 the connections are in three different planes, as shown.

Fluid distribution is effected through passages 61 which respectively communicate with the outer ends of the cylinders 3. At their inner ends the passages continue as axial valve passages 65 which are parallel to the axis of rotation of shaft 23. They all enter a peripheral header or manifold passage 67 machined in the case 1 and located around the boss 19. This machined groove 67 is covered by an annular cover plate 69 held down by means of cap screws 71 and under which is a gasket 73. An elbow 75 is connected through an opening in cover plate 69 with the passage 67. This elbow 75 is, in the case of an engine, connected with a pressure supply pipe 77. In the case of a pump it forms part of the outlet passages.

Figure 3:
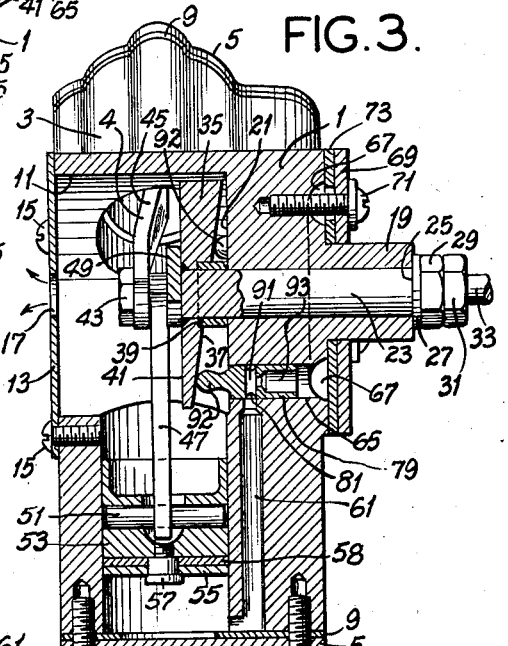
Fig. 3 is a vertical section taken on line 3—3 of Fig. 1.
Figure 2:
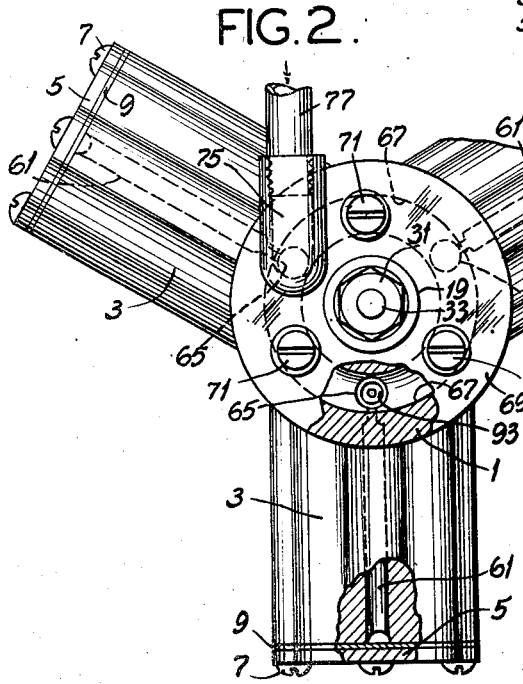
Fig. 2 is a rear elevation, parts being broken away.
Figure 4:
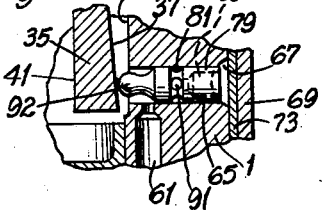
Fig. 4 is a detail section of a valve gear part shown in an alternate position from that shown in Fig. 3.

In each valve passage 65 is a piston valve 79. Each valve is of generally cylindric form having a peripheral groove 81 which, through radial ports 91 is in communication with a counterbore 93 forming a hollow skirt. The other or head end of the valve is reduced and rounded as indicated at 92 and forms a follower on the cam portion 37 of the crank disc 35. This reduced head also acts as a part of the valve porting. In Fig. 3 a valve follower 92 is shown on a low portion of the cam 37 and in Fig. 4 it is shown on a high portion. When on a low portion, the groove 81 communicates with one of the passages 61 so that fluid may flow to or from the passage 67 and to or from the respective cylinder 1. When the follower 92 is on a high part of the cam (Fig. 4), the respective port 61 is out of communication with the passage 67 and in communication with the counterbore 11 of the crankcase. Each valve is biased by means of the pressure in the passage 67 against the cam 37. In the case of an engine this is the supply pressure, and in the case of a pump it is the back pressure. This feature eliminates springs and the like for valve return.

Assuming the mechanism to be applied as an engine (or motor), pressure is applied from the pressure line 77. This finds its way through one of the open valves 79 to the head end of one of the cylinders 1. The pistons and the crank disc 35 are so phased that the corresponding piston under such conditions has just over-centered at the outer end of its action and is ready for a power stroke. This rotates the crank disc and after the power stroke has ended, the cam 37 pushes back and shuts off the respective valve 79. The next valve in order then opens, its piston having over-centered, and proceeds through a similar action. Each valve, piston and cylinder proceeds thus in succession. After a power stroke, a given piston makes a return stroke and its respective valve at this time is in the Fig. 4 position which allows its cylinder to exhaust to the crankcase, from which the fluid flows through the opening 17.

If the motive power fluid be air, this may go to waste. If it be a liquid, it may pass to a sump for subsequent use by being pumped back into the line 77.

If the device be used as a pump, then power applied to the shaft 23 rotates the disc 35 and causes reciprocation of the pistons 53. As the pistons reciprocate, the valves move under action of the cam 37 so that on suction strokes fluid is drawn in through the opening 17 and on compression strokes it is moved out through the manifold passage.

The opening 17 and passage 67 could be connected into a liquid line. For example, in gasoline dispensing circuits and the like it might be desirable to have the pump in a closed liquid circuit, the extension 33 of shaft 23 acting to drive an integrating meter or similar registering device.

It will be seen that the principle of operating the valve from a cam formed as part of a crank disc is also applicable to single-cylinder mechanisms, except that in such case a flywheel effect becomes more necessary for substantially constant velocity. With the multi-cylinder radial arrangement not so much flywheel effect is necessary to maintain smooth action. It will also be understood that the number of cylinders may be increased.

From the above it will be seen that the invention provides an extremely simple mechanism for carrying out either pump or engine constructions. The valve gear is very simple, requiring no springs.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. In a reciprocating mechanism a crankcase having a fluid transmitting opening therein, a rotary crank in said crankcase, a cylinder extending from said crankcase, a reciprocating piston therein, a connecting rod between the piston and said crank, means providing a fluid passage to the cylinder, part of said passage being substantially parallel to the axis of rotation of said crank and being in communication with a manifold, said manifold being adapted for connection to a pressure line, a reciprocating valve in said parallel part of the passage, an extension from said valve, axial cam means rotary with the crank and cooperating with said valve extension to move said valve in at least one direction, said valve being formed alternately to connect said passage with the manifold and with the inside of the crankcase as the piston reciprocates and said crank rotates.

2. In a reciprocating mechanism a crankcase having a fluid transmitting opening therein, a rotary crank disc in said crankcase, a cylinder extending from said crankcase, a reciprocating piston therein, a connecting rod between the piston and said crank disc, means providing a fluid passage through the cylinder, part of said passage being substantially parallel to the axis of rotation of said crank disc and being in communication with a manifold, said manifold being adapted for connection to a pressure line, a springless reciprocating piston valve in said parallel part of the passage, an extension from said valve, said crank disc being formed as an axial cam cooperating with said extension to move the valve in one direction, said valve being biased in the opposite direction toward contact with the cam by pressure from said manifold, said valve being formed alternately to connect said passage with the manifold and with the crankcase as the piston reciprocates and said crank disc rotates.

3. In a reciprocating mechanism a crankcase having a fluid transmitting opening therein, a rotary crank disc in said crankcase, a cylinder extending from said crankcase, a reciprocating piston therein, a connecting rod between the piston and said crank disc, means providing a fluid passage to the cylinder, part of said passage being substantially parallel to the axis of rotation of said crank disc and being in communication with a manifold, said manifold being adapted for connection to a pressure line, a reciprocating valve in said parallel part of the passage, an extension from said valve, said crank disc being formed on its side opposite the connecting rod as an axial cam cooperating with said valve extension to move said valve in at least one direction, said valve being formed alternately to connect said passage with the manifold and with the inside of the crankcase as the piston reciprocates and said cam-formed crank disc rotates.

4. In a radial reciprocating mechanism, a crankcase having a fluid transmitting opening therein, radial cylinders extending from said crankcase, reciprocating pistons in the cylinders, a crank disc in the crankcase, connecting rods connecting said piston with said crank disc and located in a plane in front of the disc, means providing fluid passages to said cylinders, each passage having a cylindrical part parallel to the axis of rotation of the crank disc and near the disc, a fluid manifold connecting said parallel passages and located on the outside of the crankcase, said manifold being adapted for connection to a pressure line, reciprocating valves in said passages located between the manifold passage and said crank disc, a cam shaped on the back of said crank disc, said valves having follower elements contacting said cam, each valve being formed alternately to connect its respective cylinder passage with said manifold and with the inside of said crankcase.

5. In a radial reciprocating mechanism, a crankcase having a fluid transmitting opening therein, radial cylinders extending from said crankcase, reciprocating pistons in the cylinders, a crank disc in the crankcase, connecting rods connecting said piston with said crank disc and located in front of the disc, one of said rods being flat and the other two having equal offsets but located reversely on opposite sides of the flat rod, means providing fluid passages to said cylinders, each passage having a cylindric part parallel to the axis of rotation of the crank disc, an annular fluid manifold connecting said parallel passages and located on the outside of the crankcase, said manifold being adapted for connection to a pressure line, reciprocating valves in said passages located between the manifold and said crank disc, a cam shaped on the back of said crank disc, said valves having follower elements contacting said cam, each valve being formed alternately to connect its respective cylinder passage with said manifold and with said crankcase.

6. In a reciprocating mechanism, a crankcase having a fluid transmitting opening therein and a cylinder extending therefrom, a reciprocating piston in the cylinder, a crank disc in the case, a connecting rod between the piston and said crank disc, means providing a passage leading from the head end of said cylinder inwardly toward the axis of rotation of said crank disc where said passage has a cylindric portion parallel to said axis of rotation, said parallel portion being adapted for connection to a pressure line, a reciprocating cylinder valve in said passage, a cam formed on the rear of said crank disc, a reduced follower portion on the valve engaging said cam portion, said valve being biased toward said cam portion by fluid pressure on its opposite end, said valve having a port which connects the cylinder only to its pressure end when the valve is at one end of the stroke, said reduced portion of the valve when the valve is at the other end of its stroke connecting said cylinder with the crankcase.

7. A reciprocating radial mechanism comprising a crankcase having a fluid transmitting opening therein and integrally disposed radial cylinders thereon, said crankcase being counterbored from one side to provide a crank compartment, reciprocating pistons in the cylinders, a crank disc in said compartment, a crankshaft supporting said crank disc and having a bearing in the case beyond the bottom of said compartment, rods connecting said pistons and said crank disc, said crank disc on its side toward the bottom of the counterbore being formed as an axial cam, a covered groove on the outside of the crankcase opposite the bottom of said counterbore and surrounding said crankshaft, said groove being adapted for connection to a pressure line, axial valve passages connecting said groove and the crankcase, radial connections from said axial passages to the ends of said cylinders, reciprocating piston valves in said axial valve passages respectively, each valve having a follower extension contacting said axial cam and being supported so that when reciprocated it alternately connects its piston passage to the peripheral groove and the crankcase, said valves being subject to pressure in said peripheral groove to be biased toward engagement with the cam by their follower portions.

VICTOR G. KLEIN.